(12) United States Patent
Arend et al.

(10) Patent No.: US 9,280,589 B2
(45) Date of Patent: Mar. 8, 2016

(54) VIRTUAL BUSINESS DESKTOP FOR ARRANGEMENT OF OBJECTS

(75) Inventors: Udo Arend, Heidelberg (DE); Vanessa Mueller, Weinheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/531,314

(22) Filed: Jun. 22, 2012

(65) Prior Publication Data

US 2013/0342580 A1  Dec. 26, 2013

(51) Int. Cl.
*G06F 17/30* (2006.01)

(52) U.S. Cl.
CPC .................. *G06F 17/30572* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0256062 A1* | 11/2007 | Madden | ........................ | 717/141 |
| 2007/0277115 A1* | 11/2007 | Glinsky et al. | ................ | 715/771 |
| 2008/0313573 A1* | 12/2008 | Nelson | ........................... | 715/854 |
| 2009/0222742 A1* | 9/2009 | Pelton et al. | ................... | 715/753 |
| 2009/0307623 A1* | 12/2009 | Agarawala et al. | ........... | 715/765 |
| 2010/0146118 A1* | 6/2010 | Wie | ................................ | 709/225 |
| 2011/0029907 A1* | 2/2011 | Bakhash | ........................ | 715/769 |
| 2012/0084570 A1* | 4/2012 | Kuzin et al. | .................... | 713/182 |

OTHER PUBLICATIONS

Lemke, Judy. Microsoft Visio 2007 Step by Step. Microsoft Press. Feb. 21, 2007. Print.*

* cited by examiner

*Primary Examiner* — Zhengxi Liu
(74) *Attorney, Agent, or Firm* — Mintz Levin Cohn Ferris Glovsky and Popeo, P.C.

(57) ABSTRACT

Methods and apparatus, including computer program products, are provided for user interfaces. In one aspect, there is provided a method. The method may include generating a virtual desktop including a plurality of objects organized in accordance with at least one of a theme and a structure; providing a navigation pane on the virtual desktop to navigate through the plurality of objects; and providing a controller to enable a multi-level zoom on at least one of the plurality of objects on the virtual desktop. Related systems, methods, and articles of manufacture are also disclosed.

9 Claims, 11 Drawing Sheets

Smallest View

305

1. Zooming Level

Workspace

310

2. Zooming Level

315

VIRTUAL BUSINESS DESKTOP FOR ARRANGEMENT OF OBJECTS

FIELD

The present disclosure generally relates to data processing and, in particular, user interfaces.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture including on-premises components. As such, the organization can in some cases be more effectively served by an on-demand system or component, such as a software as a service (SaaS) arrangement in which the ERP system architecture is hosted on computing hardware such as servers and data repositories that are maintained remotely from the organization's location and accessed on-demand by authorized users at the organization via a thin client, such as for example a web browser, over a network.

SUMMARY

Methods and apparatus, including computer program products, are provided for user interfaces. In one aspect, there is provided a method. The method may include generating a virtual desktop including a plurality of objects organized in accordance with at least one of a theme and a structure; providing a navigation pane on the virtual desktop to navigate through the plurality of objects; and providing a controller to enable a multi-level zoom on at least one of the plurality of objects on the virtual desktop.

In some implementations, the above-noted aspects may further include additional features described herein including one or more of the following. The theme may include at least one of a project, a role of a user, and a work flow. The structure may include a grid. The plurality of objects may include a plurality of graphical elements. At least one of the plurality of objects may include a graphical element representative of a link to an action on a business object in a enterprise resource planning system. A first selection of the multi-level zoom may provide a view, and a second selection of the multi-level zoom may provide another view.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
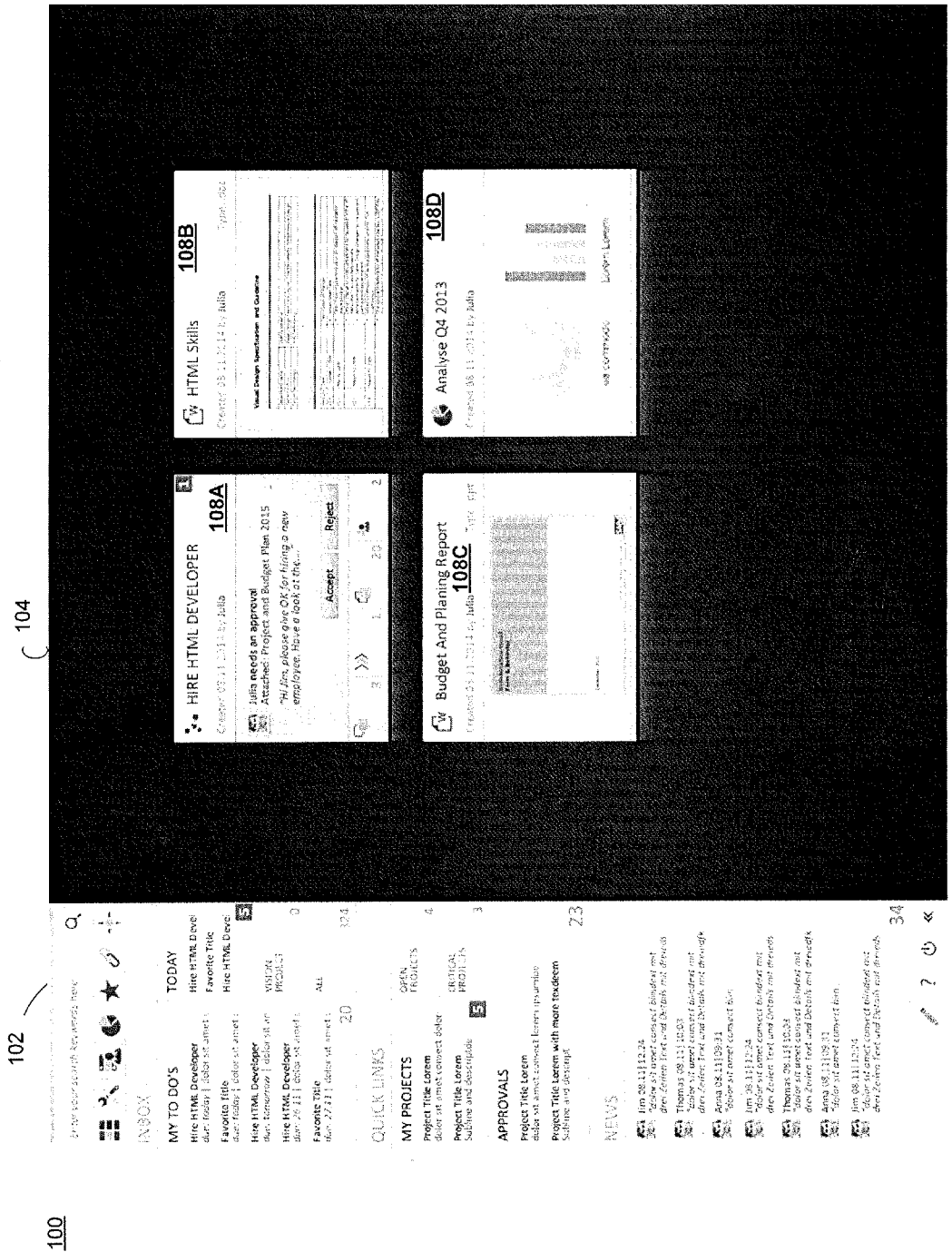
FIG. 1 depicts an example of a desktop, in accordance with some exemplary implementations.

Like labels are used to refer to same or similar items in the drawings.

DETAILED DESCRIPTION

FIG. 1 depicts examples of a desktop 100 that may be generated and then presented as a user interface at a processor for viewing, interaction, and the like. The desktop 100 may include a so-called springboard portion 102 and a desktop portion 104.

The springboard 102 may provide a collapsible tool bar portion. The desktop portion 104 may comprise a virtual desktop including objects arranged according to a structure or a theme, as described further below.

For example, the virtual desktop may include a plurality of objects organized based on a theme, such as a time lime, a workflow, a project, a role or function, and the like. Moreover, the virtual desktop may arrange these themes so that a user can move to the objects associated with a given theme. In the example of FIG. 1, the virtual desktop may include dozens if not hundreds of objects. However, only a portion of the objects 108A-D are presented (which in this example correspond to objects associated the theme of a project, such as hiring a developer).

The desktop 104 may be configured to allow a user to define the organization of work performed via the desktop. In the example of FIG. 1, the desktop represents a two dimensional space. The left portion 102 may include the springboard. The right portion 104 may be configured as a navigable space, where objects can be placed. The right portion/desktop space 104 may be navigated and organized in accordance with a theme, as noted above, or a structure, such as a grid, a time line, a cluster, and/or in any other format. The desktop may also be searchable and/or filterable according to one or more criteria. In the example of FIG. 1, criteria may filter (or search) only the objects associated with "Hiring an HTML" develop, in which case objects 108A-D would be presented, although a different criteria may result in other objects being presented on the desktop. The desktop may also be configured to support creation, deletion, opening, and printing of objects as well.

In some exemplary implementations, the desktop 100 may be hosted on a variety of platforms, such as personal computers, tablet computers, smart phones, and any other user equipment including at least one processor and at least one memory.

In some exemplary implementations, the desktop 100 may be configured to allow a user to define a workflow comprising one or more objects. In the example of FIG. 1, a user may define a workflow of objects, such as objects 108A-D. In addition, the workflow may correspond to a business process provided by an ERP system, such as the one described with respect to FIG. 6 below. The objects on the desktop may comprise an item, a document, an HTML link, a view, an icon, a business process, a storage location in a collaboration cloud, a note, a report, a contact, and a tool (e.g., a calendar tool, a calculator tool, a map tool, a weather tool, a stock tool, an email tool, a contacts tool, a clock tool, a push enabled application, a news feed, a favorite, a social networking object, and the like). Moreover, the object may correspond to business object including data and methods in a multi-tenant, cloud-based system, as described further below.

The desktop 100 may thus provide a space where objects can be organized and accessed. Moreover, the objects may be organized in a thematic and structured way, as noted above. In addition, the objects of desktop 100 may be organized in a so-called "virtual" desktop according to a structure or a theme. The virtual desktop refers to a desktop includes a viewable portion presented on a display screen and another portion which is not viewable until navigated to. The virtual desktop is further described below.

The desktop may also allow a user to zoom into the details of an object while maintaining the context of the object within the theme or the structure. The desktop may also be configured to allow selection and execution of applications (e.g., with a click) as well as dropping and dragging actions to select, move, and/or perform other actions.

Figure 2A:
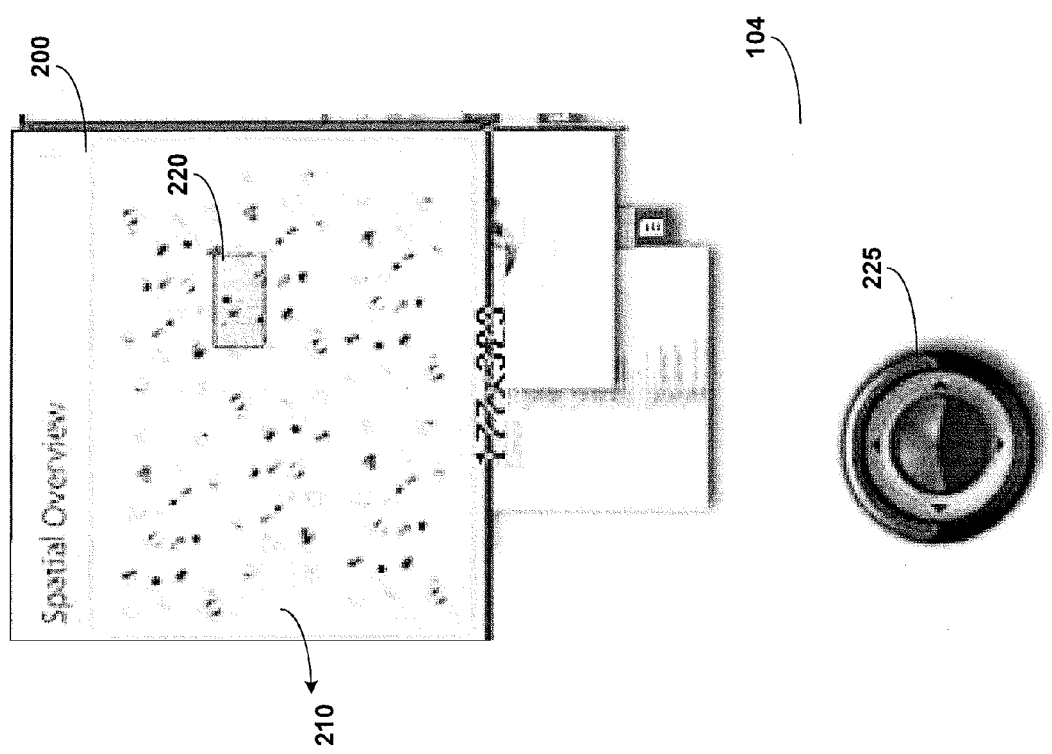
FIG. 2A depicts an example implementation of a spatial overview of a desktop, in accordance with some exemplary implementations.

FIG. 2A depicts a spatial overview 200 of a virtual desktop, such as desktop 100. The spatial overview 200 may present dozens if not hundreds of objects 210 (depicted as small polygons or icons) of a virtual desktop organized according to a structure or a theme. The spatial overview 200 also includes a navigation tool 220 controlled by element 225 to allow a user to navigate through the objects of the virtual desktop until an object of interest is found. In the example of FIG. 2A, the objects within navigation tool 220 may correspond to objects 108A-D. Although the navigation tool 220 and controller 225 may be used to locate objects, the objects may also be accessed using a search or a filter as well.

Figure 2B:
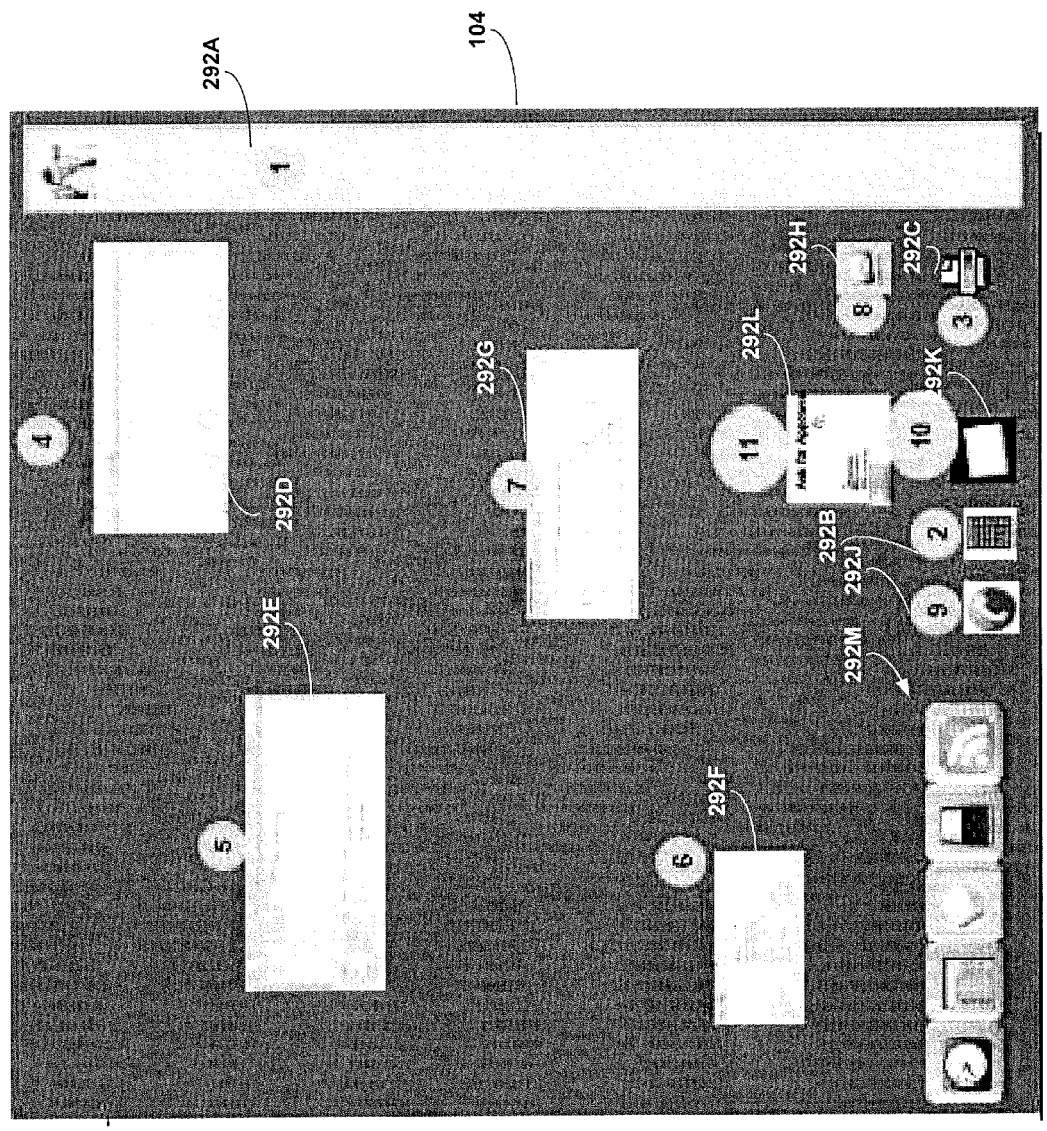
FIG. 2B depicts another example of a desktop, in accordance with some exemplary implementations.

FIG. 2B depicts another example of a desktop 290 including object 292A (a contact list), object 292B (a calculator), object 292C (a printer), object 292D (a calendar), object 292E (a Gantt Chart), object 292F (an organizational chart), object 292G (a report), object 292H (an electronic posting), object 292I (a telephone function), object 292J (a notepad), object 292K (notifications), as well as other objects 292L.

Figure 3:
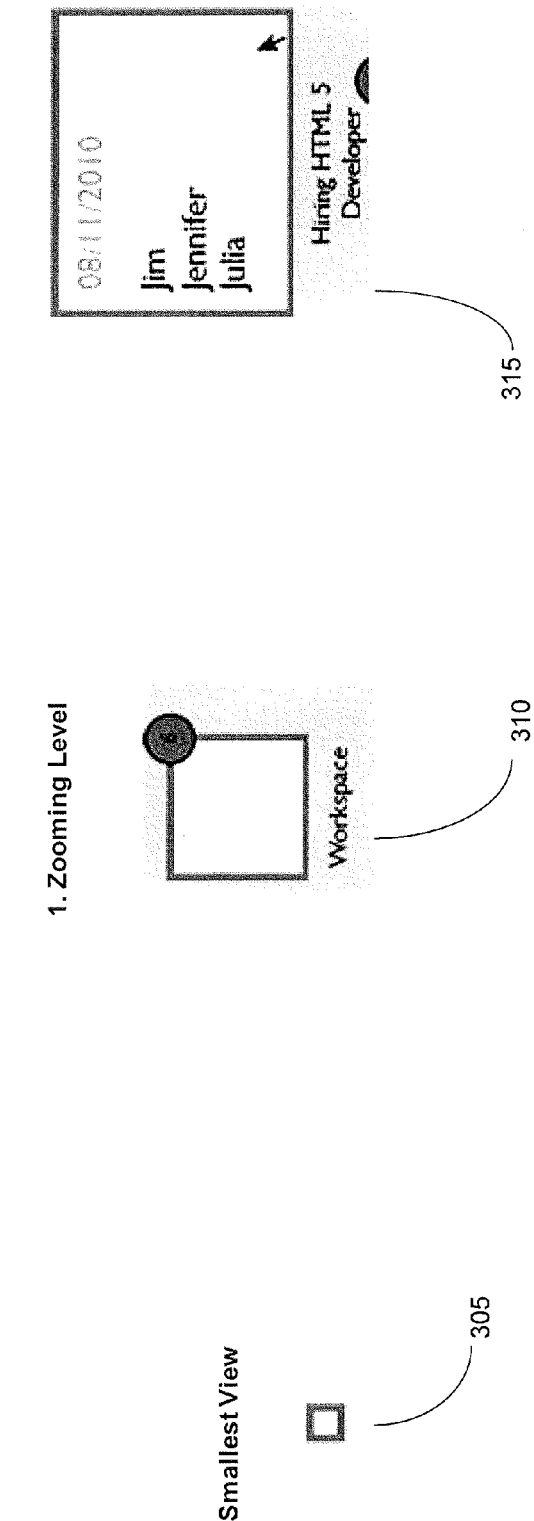
FIG. 3 depicts an example implementation of multi-level zoom on an icon of the desktop, in accordance with some exemplary implementations.

FIG. 3 depicts a multi-level zoom function, which may be configured to allow a user to zoom into an icon or item to view more content. For example, an object on a desktop can be selected, such as icon 305, which in this example is a small pictogram representative of the object. The pictogram is visually distinguishable and identifiable from other objects on the desktop. When a user selects the icon 305 at the desktop, the user may select the icon 305 and vary the zoom level to change the size of the icon to a large view 310 and an even larger view 315. For example, a user may select (e.g., click, scroll, mouse over, and the like), icon 305, and repeatedly select the icon 305 to obtain the larger views 310 and 315. The larger views 310 and 315 may include actual content from the object. The content shown at 430 may be defined by the user.

The virtual desktop and the spatial overview may be configured to allow a user to move readily to objects associated with a given theme, such as a task, a role, and the like. Moreover, the virtual desktop may be configured to allow a user to define comments (e.g., virtual sticky notes) for a given portion of the desktop and place them according to a structure or theme on the desktop.

The virtual desktop 300 may be organized, as noted, in a variety of ways. For example, a user may define that objects are to be organized according to time (e.g., activities assigned to time axis based on dates, deadlines, and the like). The user may also organize objects based on a predefined business processes. The user may also organize objects based on non-work related themes. For example, the user may organize objects on virtual desktop 300 for personal use (e.g., objects related to personal contacts, calendars, and photos).

Figure 4:
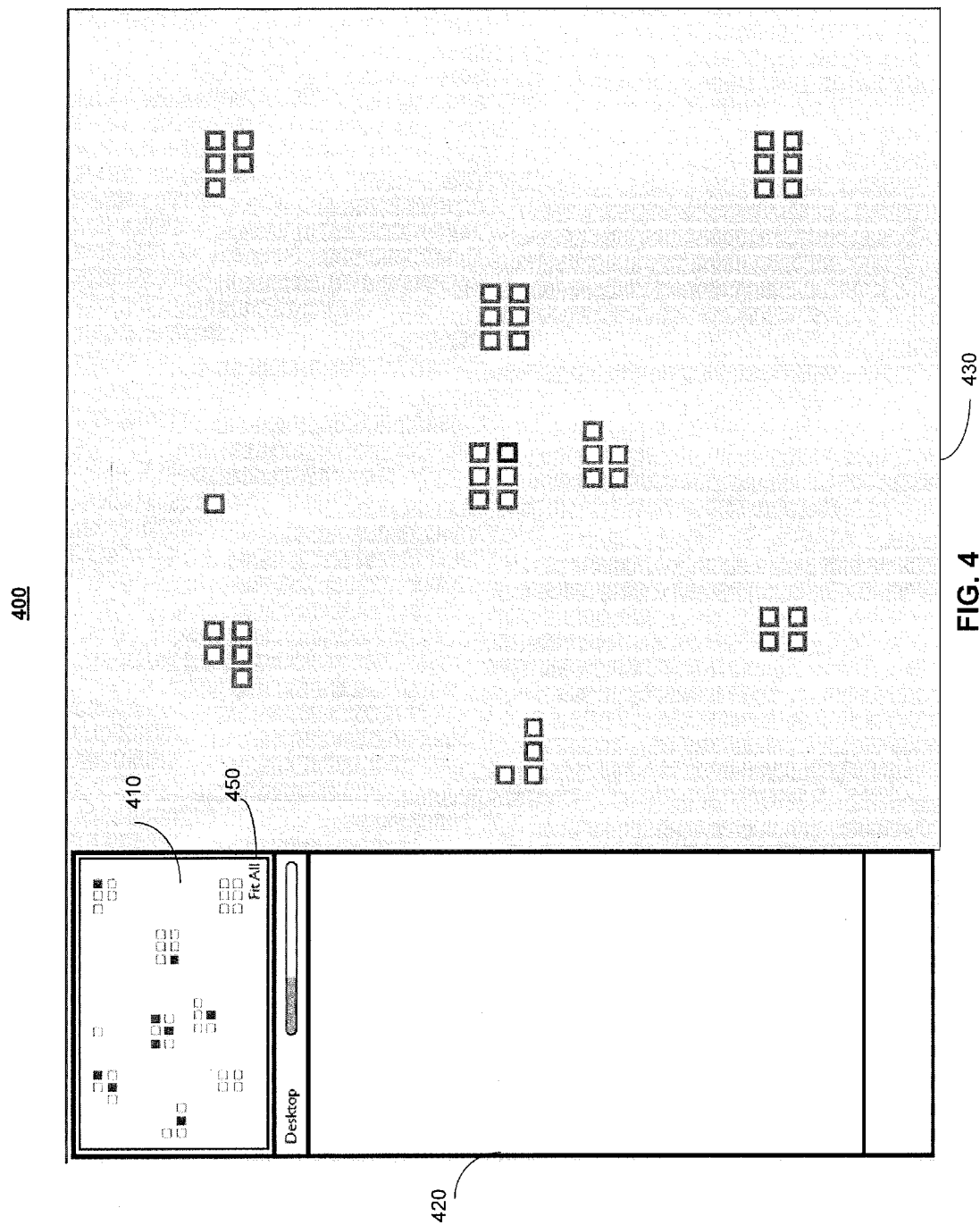
FIGS. 4, 5A, 5B, and 5C depict examples of wireframes of desktops, in accordance with some exemplary implementations.

FIGS. 4, 5A, 5B, and 5C depict examples of wireframes. In particular, FIG. 4 depicts a desktop 400 including a spatial overview 410, a springboard 420, and a virtual desktop 430 including objects (represented by polygons). In the example of FIG. 4, a selection of "Fits All" 450 places all of the objects on the virtual desktop 430.

Figure 5A:
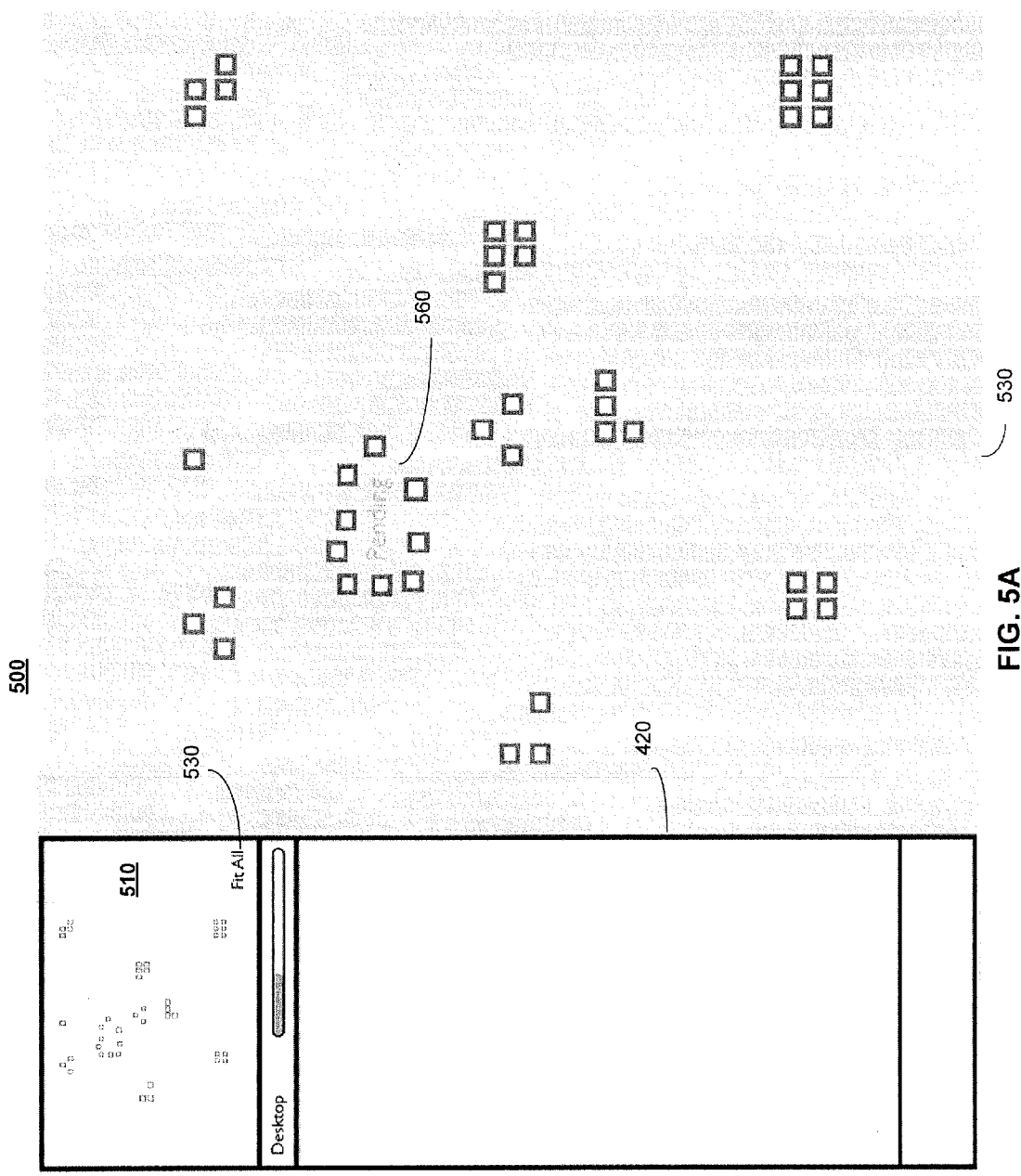
Figure 5B:
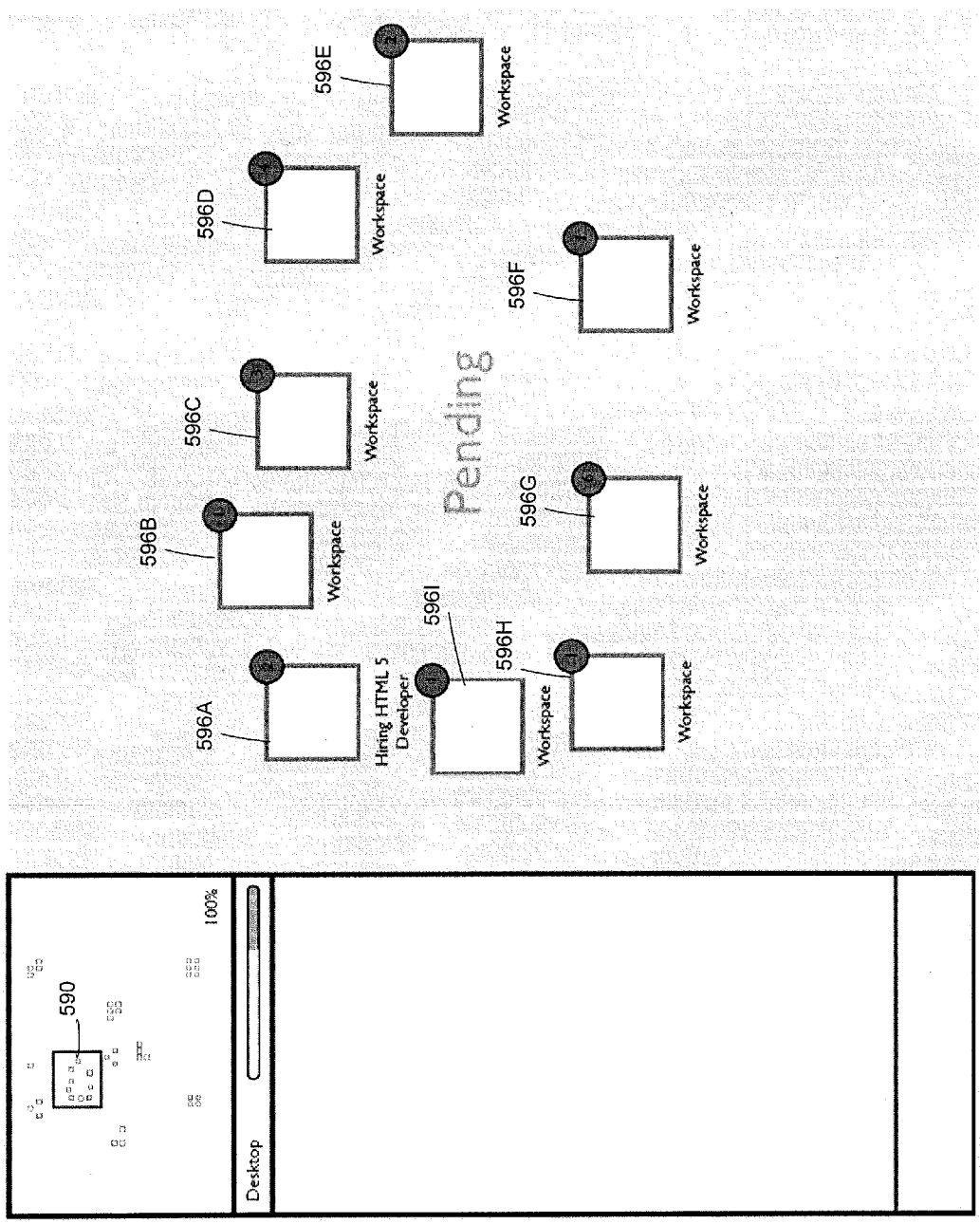
Figure 5C:
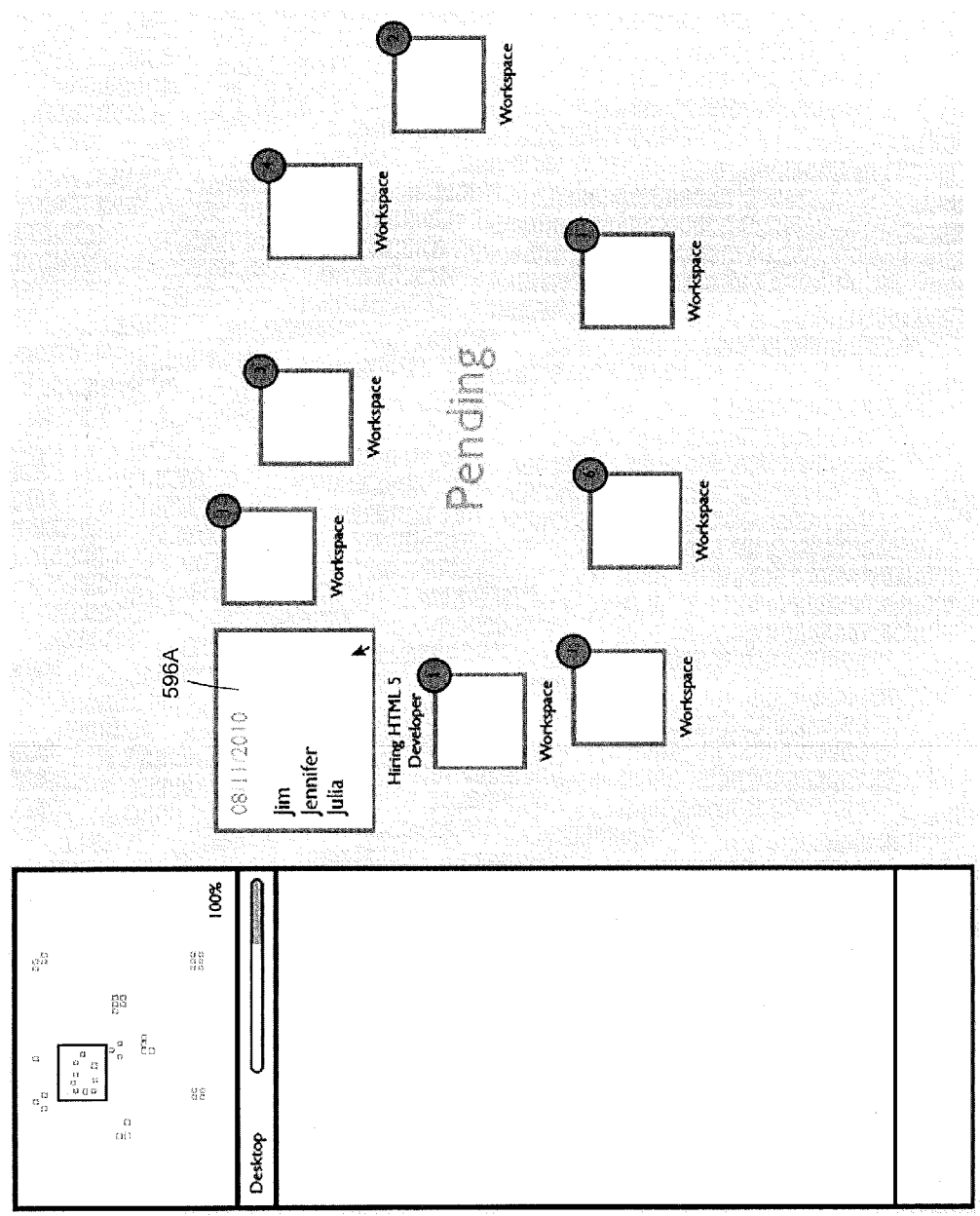

FIG. 5A depicts a desktop 500 including a spatial overview 510, a springboard 520, and a virtual desktop 530 including objects (represented by polygons). In the example of FIG. 5A, a selection of Fits All 550 places all of the objects on the virtual desktop 530. FIG. 5B also depicts that the objects 560 are pending to be completed as part of a work list or work flow being handled by, for example, an ERP system, such as for example the one described below with respect to FIG. 6. FIG. 5B depicts navigation pane 590 presenting pending objects 596A-I. The navigation pane 590 can be moved (e.g., using a mouse or other controller) to other objects. FIG. 5C depicts multi-level zooming to an object 596A to view content within the object.

Figure 6:
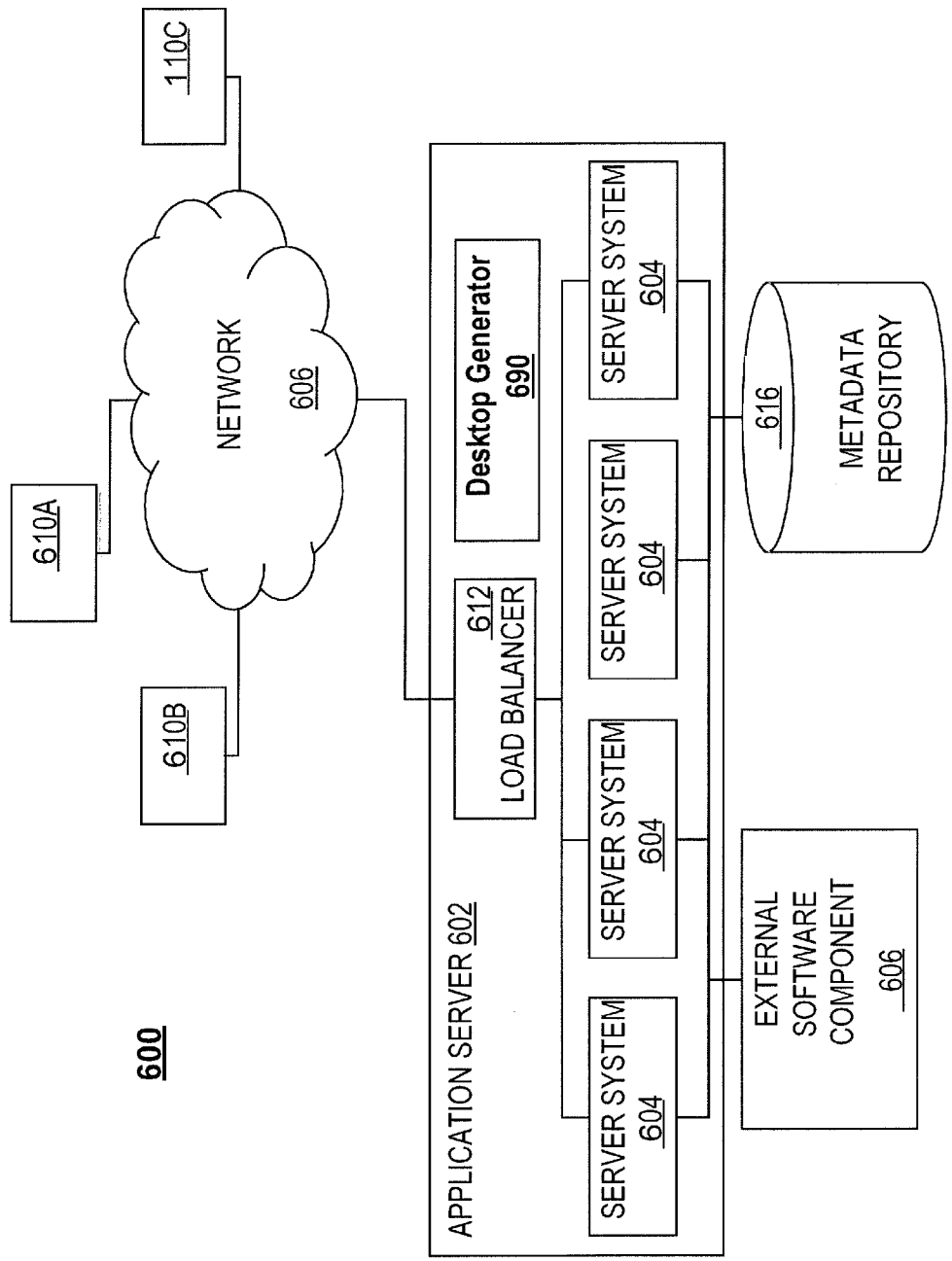
FIG. 6 depicts an example of a system implemented in a multi-tenant cloud-based framework, in accordance with some exemplary implementations.

Although the disclosed virtual desktop may be used on a variety of platforms, in some implementations, the disclosed virtual desktop may be used in conjunction with an ERP, such as the one described with respect to FIG. 6.

FIG. 6 shows a block diagram of a multi-tenant implementation of a software delivery architecture 600 that includes an application server 602, which can in some implementations include multiple server systems 604 that are accessible over a network 606 from client machines operated by users at each of multiple organizations 610A-610C (referred to herein as "tenants" of a multi-tenant system) supported by a single software delivery architecture 600.

FIG. 6 also depicts a desktop generator 690 for generating the desktops and associated functionality disclosed herein. Although FIG. 6 depicts a location for desktop generator 690, desktop generator 690 may be located in other locations as well. Moreover, the desktop generator 690 may be distributed among multiple locations.

For a system in which the application server 602 includes multiple server systems 604, the application server can include a load balancer 612 to distribute requests and actions from users at the one or more organizations 610A-610C to the one or more server systems 604. A user can access the delivery architecture across the network using a thin client, such as for example a web browser or the like, or other portal software running on a client machine. The desktops disclosed herein may be presented and/or implemented at the user interfaces associated with 610A-610C.

The application server 602 can access objects, such as data, data objects, and the like, stored in one or more data repositories 616. The application server 602 can also serve as a middleware component via which access is provided to one or more external software components 606.

A multi-tenant system such as that described herein can include one or more of support for multiple versions of the core software, backwards compatibility with older versions, stateless operation in which little, or no, user data or business data are retained at the thin client, and little, or no, need for tenant configuration on the central system. As noted above, in some implementations, support for multiple tenants can be provided using an application server 602 that includes multiple server systems 604 that handle processing loads distributed by a load balancer 612. Potential benefits from such an arrangement can, in some implementations, include, high and reliably continuous application server availability and minimization of unplanned downtime, phased updating of the multiple server systems 304 to permit continuous availability (one server system 604 can be taken offline while the other systems continue to provide services via the load balancer 612), scalability via addition or removal of a server system 604 that is accessed via the load balancer 612, and de-coupled lifecycle processes (such as for example system maintenance, software upgrades, etc.) that enable updating of the core software independently of tenant-specific customizations implemented by individual tenants.

As in the example illustrated in FIG. 6, the metadata repository 616 can store a business object that represents a template definition of a standard business process, such as a workflow. Each individual tenant 610A-610C can customize that standard template according to the individual business process features specific to business of the organization to which that tenant is assigned. Customizations can be stored as extensions in the metadata repository.

Figure 7:
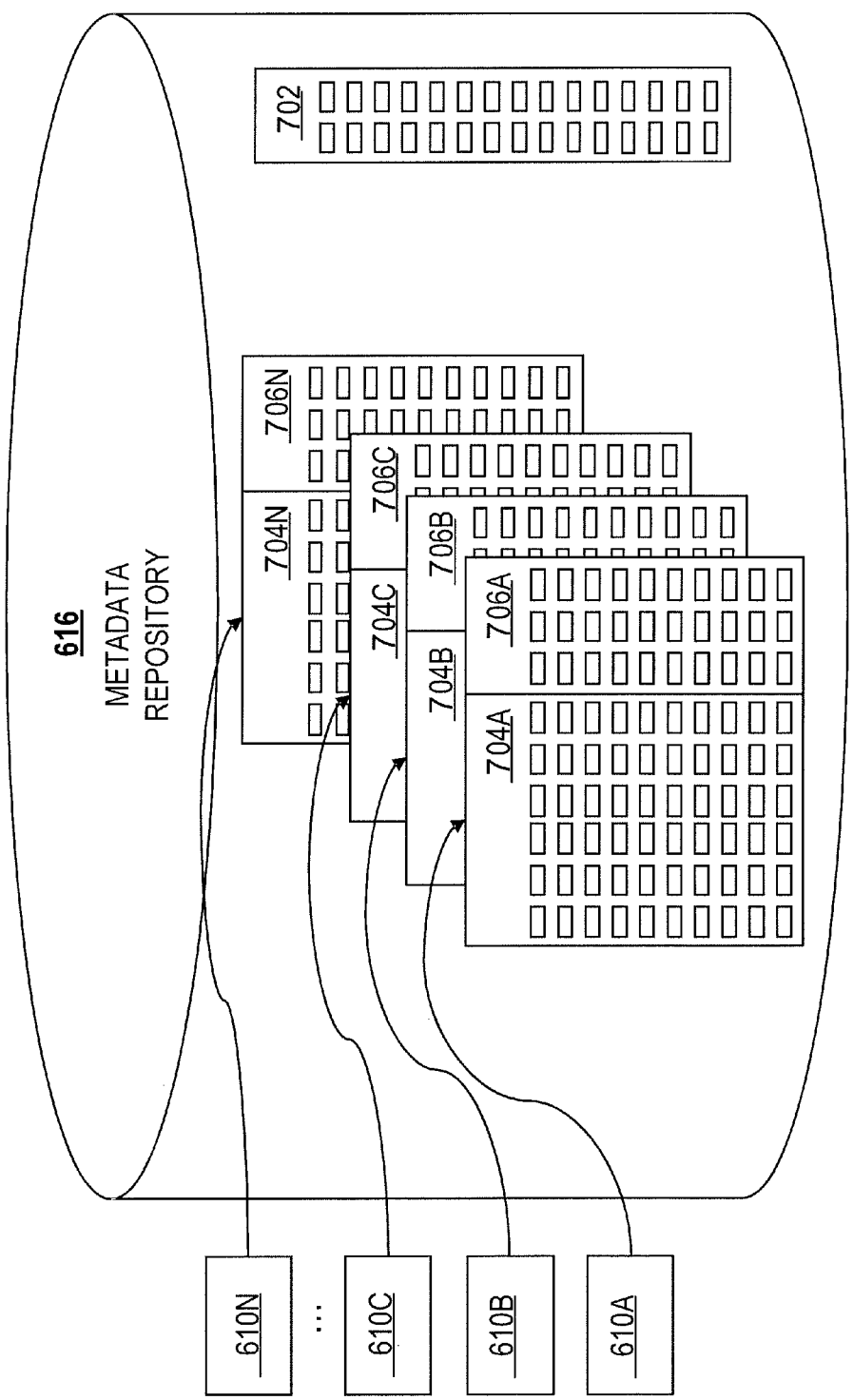
FIG. 7 depicts an example of metadata repository for multi-tenant data, in accordance with some exemplary implementations.

To provide for customization of the business process for each of multiple organizations supported by a single software delivery architecture 600, the data and data objects stored in the metadata repository 616 and/or other data repositories that are accessed by the application server 602 can include three types of content as shown in FIG. 7: core software platform content 702 (e.g. a standard definition of a business process), system content 704, and tenant content 706.

Core software platform content 702 may include content that represents core functionality and is not modifiable by a tenant.

System content 704 can in some examples be created by the runtime of the core software platform and can include core data objects that store concrete data associated with specific instances of a given business process and that are modifiable with data provided by each tenant. The data retained in these data objects are tenant-specific: for example, each tenant 110A-110N can store information about its own inventory, sales order, etc.

Tenant content 706A-706N may include data objects or extensions to other data objects that are customized for one specific tenant 610A-610N to reflect business processes and data (e.g., business objects) that are specific to that specific tenant and are accessible only to authorized users at the corresponding tenant. Such data objects can include a key field (for example "client" in the case of inventory tracking) as well as one or more of master data, business configuration information, transaction data, or the like. For example, tenant content 406 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like).

Figure 8:
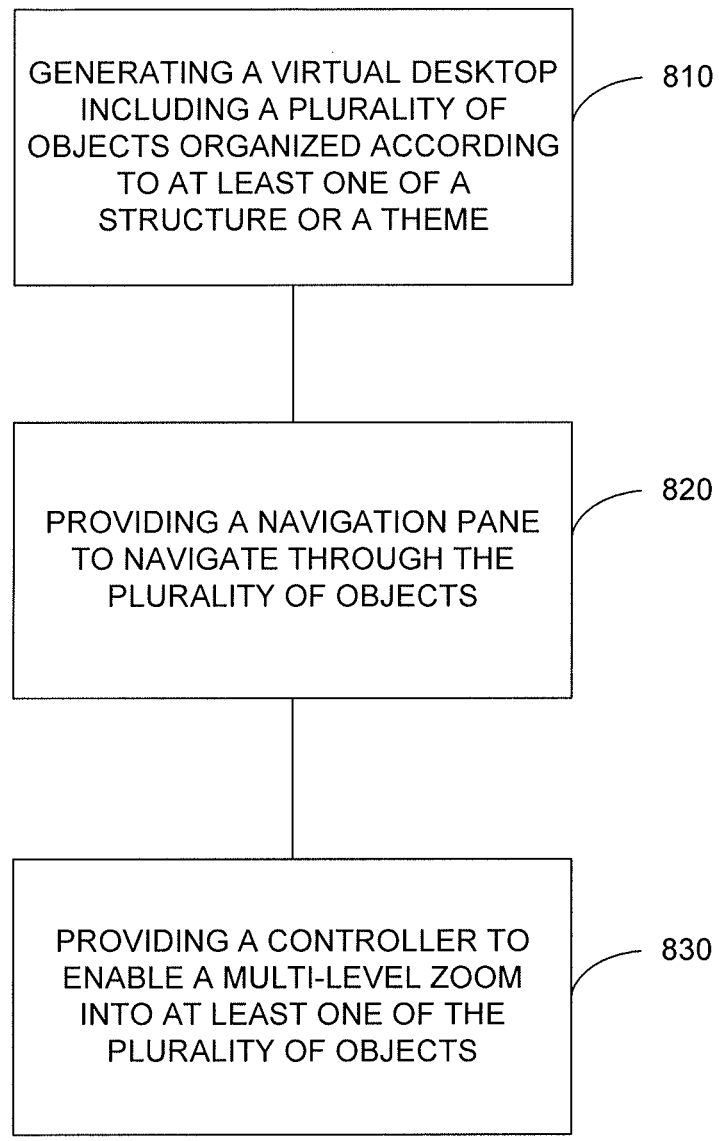
FIG. 8 depicts an example process, in accordance with some exemplary implementations.

FIG. 8 depicts an example process 800 for the virtual desktop disclosed herein.

At 810, a virtual desktop may be generated. The virtual desktop may include a plurality of objects organized according to a structure or a theme. As noted above, the virtual desktop may include a plurality of objects, a portion of which are presented at a user interface, while another portion of the objects may be virtually maintained and viewed at the user interface when a navigation pane is used to move to the objects. In some exemplary implementations, the desktop generator 690 generates the virtual desktops and the features described herein with respect to the desktop. At least one of the objects may be associated with data stored in a multi-tenant framework as described with respect to FIGS. 6 and 7.

At 820, a navigation pane may be generated and then provided for use with the virtual desktop. Referring to the example depicted at FIG. 2A, a navigation pane 220 may be moved using controller 225 to view objects on the virtual desktop. As a user navigates to objects, those objects are presented on the desktop, such as right hand portion 104 of the desktop (FIG. 1).

At 830, a multilevel zoom controller may be provided for use with the virtual desktop. Referring to the example of FIG. 3, a user may access a controller (e.g., a mouse scroll wheel, icon on desktop, and the like) to select an object, such as object 305, and implement a multi-level zoom on the object, which ultimately results in the presentation of some of the content of the object. Moreover, the presented content may be defined by a user.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A non-transitory computer-readable medium containing instructions to configure at least one processor to perform operations comprising:
   generating a virtual desktop including a plurality of icons representative of a plurality of objects organized in accordance with at least one theme corresponding to a workflow configurable by a user, wherein a first portion of the plurality of icons are presented as a first view configured for a multi-level zoom via a viewable portion of the virtual desktop, wherein a second portion of the plurality of icons are not included in the viewable portion of the virtual desktop, wherein the first portion represents a first set of tasks of the workflow and the second portion represents a second set of tasks of the workflow;
   providing a navigation pane on or adjacent to the virtual desktop, wherein the navigation pane provides a spatial overview of the plurality of icons including the first portion and the second portion to enable navigation from the first portion to the second portion to enable the second portion to be included in the viewable portion of the virtual desktop;
   providing a controller to enable the multi-level zoom on at least one icon contained in the first portion of the plurality of icons on the virtual desktop; and
   generating, based on the multi-level zoom, a second view representative of the at least one icon, and a third view representative of the at least one icon, wherein the second view provides a second zoom level that is more zoomed-in on the at least one icon when compared to the first view, and the second view provides, in comparison to the first view and based on the second zoom level, additional descriptive information of the at least one icon, wherein the third view provides a third zoom level that is more zoomed-in on the at least one icon when compared to the second view, and the third view provides, in comparison to the second view and based on the third zoom level, additional descriptive information of the at least one icon, and wherein at least one of the plurality of icons allows selection and execution of an application.

2. The non-transitory computer-readable medium of claim 1, wherein the theme comprises at least one of a project, a role of a user, and a work flow.

3. The non-transitory computer-readable medium of claim 1, wherein at least one of the plurality of icons comprise a link to an action on a business object in an enterprise resource planning system.

4. A system comprising:
   at least one processor; and
   at least one memory including containing instructions to configure the at least one processor to perform operations comprising:
      generating a virtual desktop including a plurality of icons representative of a plurality of objects organized in accordance with at least one theme corresponding to a workflow configurable by a user, wherein a first portion of the plurality of icons are presented as a first view configured for a multi-level zoom via a viewable portion of the virtual desktop, wherein a second portion of the plurality of icons are not included in the viewable portion of the virtual desktop, wherein the first portion represents a first set of tasks of the workflow and the second portion represents a second set of tasks of the workflow;
      providing a navigation pane on or adjacent to the virtual desktop, wherein the navigation pane provides a spatial overview of the plurality of icons including the first portion and the second portion to enable navigation from the first portion to the second portion to enable the second portion to be included in the viewable portion of the virtual desktop;
      providing a controller to enable the multi-level zoom on at least one of the first portion of the plurality of icons on the virtual desktop; and
      generating, based on the multi-level zoom, a second view representative of the at least one icon, and a third view representative of the at least one icon, wherein the second view provides a second zoom level that is more zoomed-in on the at least one icon when compared to the first view, and the second view provides, in comparison to the first view and based on the second zoom level, additional descriptive information of the at least one icon, wherein the third view provides a third zoom level that is more zoomed-in on the at least one icon when compared to the second view, and the third view provides, in comparison to the second view and based on the third zoom level, additional descriptive information of the at least one icon, and wherein at least one of the plurality of icons allows selection and execution of an application.

5. The system of claim 4, wherein the theme comprises at least one of a project, a role of a user, and a work flow.

6. The system of claim 4, wherein at least one of the plurality of icons comprise a link to an action on a business object in an enterprise resource planning system.

7. A method comprising:
generating a virtual desktop including a plurality of icons representative of a plurality of objects organized in accordance with at least one theme corresponding to a workflow configurable by a user, wherein a first portion of the plurality of icons are presented as a first view configured for a multi-level zoom via a viewable portion of the virtual desktop, wherein a second portion of the plurality of icons are not included in the viewable portion of the virtual desktop, wherein the first portion represents a first set of tasks of the workflow and the second portion represents a second set of tasks of the workflow;
providing a navigation pane on or adjacent to the virtual desktop, wherein the navigation pane provides a spatial overview of the plurality of icons including the first portion and the second portion to enable navigation from the first portion to the second portion to enable the second portion to be included in the viewable portion of the virtual desktop;
providing a controller to enable the multi-level zoom on at least one of the first portion of the plurality of icons on the virtual desktop; and
generating, based on the multi-level zoom, a second view representative of the at least one icon, and a third view representative of the at least one icon, wherein the second view provides a second zoom level that is more zoomed-in on the at least one icon when compared to the first view, and the second view provides, in comparison to the first view and based on the second zoom level, additional descriptive information of the at least one icon, wherein the third view provides a third zoom level that is more zoomed-in on the at least one icon when compared to the second view, and the third view provides, in comparison to the second view and based on the third zoom level, additional descriptive information of the at least one icon, and wherein at least one of the plurality of icons allows selection and execution of an application.

8. The method of claim 7, wherein the theme comprises at least one of a project, a role of a user, and a work flow.

9. The method of claim 7, wherein at least one of the plurality of icons comprise a link to an action on a business object in an enterprise resource planning system.

* * * * *